United States Patent [19]

Percec

[11] Patent Number: 4,638,039

[45] Date of Patent: Jan. 20, 1987

[54] ALTERNATING BLOCK COPOLYMERS OF POLYARYLENE POLYETHERS AND PROCESS FOR THEIR PREPARATION

[75] Inventor: Virgil Percec, Pepper Pike, Ohio

[73] Assignee: The B. F. Goodrich Company, Akron, Ohio

[21] Appl. No.: 655,925

[22] Filed: Sep. 28, 1984

[51] Int. Cl.$^4$ .................... C08F 283/00; C08G 75/00
[52] U.S. Cl. .................................... 525/534; 525/535
[58] Field of Search ............................... 525/534, 535

[56] References Cited

U.S. PATENT DOCUMENTS

| | | | |
|---|---|---|---|
| 3,717,618 | 2/1973 | Oswald | 526/285 |
| 4,116,936 | 9/1978 | Stelner | 526/286 |
| 4,258,175 | 3/1981 | Chen | 528/219 |
| 4,431,761 | 2/1984 | Hergenrother | 525/534 |
| 4,471,106 | 9/1984 | Luecke et al. | 525/534 |
| 4,486,576 | 12/1984 | Colon et al. | 528/212 |
| 4,510,296 | 4/1985 | Hergenrother | 525/534 |
| 4,562,243 | 12/1985 | Percec | 525/534 |

*Primary Examiner*—Lucille M. Phynes
*Attorney, Agent, or Firm*—Alfred D. Lobo

[57] ABSTRACT

A modified Williamson etherification in the presence of phase transfer catalyst is used to synthesize alternating block copolymers and regular copolymers. Unsaturated polyethers of a polynuclear dihydric phenol containing chloroallylic (electrophilic) end groups (prepared from cis- or trans-1,4-dichloro-2-butene and Bisphenol A) and aromatic poly(ether sulfone)s containing terminal phenol (nucleophilic) groups are polycondensed in the presence of tetrabutylammonium hydrogen sulfate as phase transfer catalyst to give alternating block copolymers. The same telechelic polymers were chain-extended with dinucleophilic or dielectrophilic monomers under similar reaction conditions. Both the regular copolymers and the alternating block copolymers were characterized by gel permeation chromatography and DSC.

9 Claims, No Drawings

ALTERNATING BLOCK COPOLYMERS OF POLYARYLENE POLYETHERS AND PROCESS FOR THEIR PREPARATION

BACKGROUND OF THE INVENTION

An effective method for the preparation of a block copolymer offers one the opportunity to modify the copolymer with monomers which are normally incompatible. Thus the process permits the chemical union of two incompatible macromolecules which would otherwise be difficult to link. A successful process for synthesis of a block copolymer requires a reliable polymerization process which is not hindered by the usual problems of linking already formed polymer chains.

It was the hope that a phase transfer catalyzed (PTC) reaction would lend itself to the synthesis of desirable polymers and free the process from the use of anhydrous aprotic solvents, which led me to exploit the particular characteristics of a PTC reaction for the purpose at hand. In nucleophilic displacement step-growth polymerizations, for example in the synthesis of polyethers and polycarbonates, these characteristics are as follows: (a) the reaction is very fast, reaching 100% yield and high molecular weight (mol wt) in a few minutes; (b) the polymer's mol wt does not depend strongly on the ratio between the nucleophilic and electrophilic reactants as in conventional step polymerizations; and, (c) the obtained polymer almost always contains electrophilic species as chain ends, independent of the reaction yield and reactant ratio.

It is hypothesized that the etherification reaction occurs in the organic phase according to a mechanism similar to that of interfacial polycondensation. The concentration of reactive bisphenolate in the organic phase is controlled by the concentration of the PTC and is very low in comparison with that of the electrophilic monomer. I eventually came to realize that PTC reactions can be exploited as a simple method for the synthesis of telechelic polymers containing electrophilic chain ends. These polymers with functional electrophilic end groups are useful polymeric materials because they can be further used as macroinitiators for cationic polymerization and for synthesis of ordered and block copolymers by condensation polymerization in the presence of a PTC.

The particular interest of this invention is to tailor an (A)(B) type block copolymer of polyarylene polyether ("PAPE") segments so that the block copolymer exhibits desired properties, for example, the ability to withstand thermal degradation at a temperature in the range from above 100° C. to about 200° C.

This invention is more particularly related to block copolymers formed by combining a PAPE segment A having phenolic (Ph) or thiophenolic (TPh) chain ends with a PAPE segment B having haloallylic chain ends. Segment A consists essentially of polymers of dihydroxybenzene, dihydroxynaphthalene, and diphenols, all referred to herein as dihydric phenols ("DHP"), and the corresponding sulfur (thio) compounds referred to as dihydric thiophenols ("DHTP"), which polymers have a $\overline{M}_n$ (number average mol wt) less than about 10,000, hence termed oligomers. One or the other DHP and DHTP, or both, are referred to herein as "DH(T)P" for brevity. Such oligomers are defined herein as polymers containing from 2 to about 100 repeating units each having the formula—DH(T)-P$_1$—DH(T)P$_2$—, where DH(T)P$_1$ and DH(T)P$_2$ each represents the residue of a DH(T)P. These oligomers contain at least three phenyl or thiophenyl rings which may have inert substituents, each ring linked to another through an O, Si, C or S atom. Such DHP and DHTP oligomers, also, poly[DH(T)P], or [DH(T)P]$_n$, are terminated at each end (hence "di-terminated") with a phenol ("Ph") or thiophenol ("TPh") group respectively, which group may also have inert substituents. For brevity, "di-(T)Ph-terminated" refers herein to either or both oligomers which are Ph- and TPh-terminated respectively, the preparation of which oligomers is described in detail in my copending U.S. patent application Ser. No. 586,678 filed Mar. 6, 1984 the disclosure of which is incorporated by reference thereto as if fully set forth herein.

Specific alternating block copolymers and regular (chain extended) polymers and details of their preparation, analyses of the copolymers obtained, and a discussion of various aspects of their preparation and results of the analyses, are provided in an article titled "Functional Polymers and Sequential Copolymers by Phase Transfer Catalysis. 6. On the Transfer Catalyzed Williamson Polyetherification as a New Method for the Preparation of Alternating Block Copolymers" by Virgil Percec, Brian C. Auman and Peter L. Rinaldi, *Polymer Bulletin* 10, 391–396 (1983), and in another article titled "Functional Polymers and Sequential Copolymers by Phase Transfer Catalysis, 1.-Alternating Block Copolymers of Unsaturated Polyethers and Aromatic Poly(ether sulfone)s" by Virgil Percec and Brian C. Auman, *Makromol. Chem.* 185 617–627 (1984), the disclosures of which articles and relevant portions of the references cited therein are incorporated by reference thereto as if fully set forth herein.

SUMMARY OF THE INVENTION

It has been discovered that a Williamson etherification in the presence of a phase transfer catalyst (referred to as a modified Williamson etherification) yields alternating block copolymers and regular copolymers.

More particularly, it has been discovered that a bisphenolate or bisthiophenolate ("bis(thio)phenolate) salt of a DH(T)P may be polymerized with a monomer having a haloallylic group, preferably in situ, in the presence of an effective amount of phase transfer catalyst "PTC" sufficient to solubilize the salt in the organic phase and essentially to negate hydrolysis of the oligomer.

It is therefore a general object of this invention to provide unsaturated alternating block copolymers consisting essentially of PAPE-containing segments by first forming the bis(thio)phenolate of a PAPE oligomer, preferably in situ, by combining di-(T)Ph-terminated PAPE segments with PAPE segments having haloallylic end groups in the presence of an effective amount of PTC sufficient to solubilize the salt in the organic phase and essentially to negate hydrolysis of the oligomer.

It is also a general object of this invention to provide unsaturated chain extended copolymers consisting essentially of a PAPE oligomer extended by the residue of a reactive moiety containing a haloallylic group, by first forming the bisphenolate or bisthiophenolate of a PAPE oligomer, preferably in situ, by combining di-(T)Ph-terminated PAPE segments with PAPE segments having haloallylic end groups in the presence of an effective amount of PTC sufficient to solubilize the salt in the organic phase and essentially to negate hydrolysis of the oligomer.

It is a specific object of this invention to provide novel alternating block and unsaturated regular copolymers by combining aromatic polyether sulfone "APS" segments having terminal phenol groups (prepared from 4,4'-dichlorodiphenyl sulfone "DCPS" and bisphenol A "BPA"), with unsaturated polyethers containing chloroallylic end groups (prepared from cis- or trans-1,4-dichloro-2-butene "DCB" and BPA) as the nucleophilic chain ends; or, by chain extending the APS segments with DCB.

DETAILED DESCRIPTION OF PREFERRED EMBODIMENTS

In preferred embodiments of my invention which yield novel unsaturated alternating block copolymers, or unsaturated regular copolymers, the method consists of a PTC polyetherification of telechelic polymers containing α-ω-di(nucleophilic) and α-ω-di(electrophilic) chain ends. The result is the formation of a difunctionalized substantially linear thermoplastic polyarylene polyether oligomer, or polyarylene polythioether oligomer (PAPE) represented by the formula:

   I wherein,
R represents O or S in an ether linkage with $R_e$;
$R^e$ represents a residuum selected from $R_1{}^eX'$ and $R_2{}^eRH$;
$R_1{}^eX'$ represents a residuum of a reactive bis(haloallyl)moiety "HAM";
$R_2{}^e$ represents the group

   II

X' represents halogen selected from the group consisting of fluorine, chlorine and bromine;
X" represents an inert substituent defined hereinbelow; and,
"PAPE" represents the residuum of an oligomer selected from an unsaturated alternating block copolymer represented by

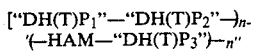   III and a regular unsaturated oligomer formed by chain extension represented by

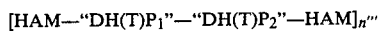   IV wherein, "DH(T)P$_1$" and "DH(T)P$_2$" are the residues of DH(T)P$_1$ and DH(T)P$_2$ which are the same or different, and "DH(T)P$_3$" is the residue of DH(T)P$_3$ which may be the same as either DH(T)P$_1$ or DH(T)P$_2$, or different;
HAM represents the residue of a reactive bis(haloallyl)moiety selected from a bis(haloallyl)olefin having from 4 to about 20 carbon atoms such as cis- or trans-dichlorobutene, a bis(haloallyl)cycloolefin having from 4 to about 8 ring carbon atoms such as 1,4-bis(chloromethyl)-1,3-cyclohexadiene, and a bis(haloallyl)arylene having from 8 to about 26 carbon atoms such as 1,4-bis(chloromethyl)benzene; and, n', n" and n''' independently represent an integer in the range from 2 to about 100.

Preferred [DH(T)P]$_n$ are oligomers formed from one or more polynuclear dihydric phenols or thiphenols having a structure

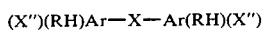   V

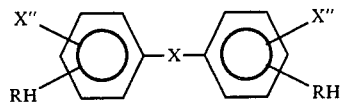

wherein,
R represents O or S;
X represents a bond between aromatic carbon atoms or a divalent connecting radical selected from the group consisting of C=O, —O—, —S—, —S—S—, —SO$_2$—, —Si— and divalent organic hydrocarbon radicals such as alkylene, alkylidene, cycloaliphatic, or the halogen, alkyl, aryl, or like substituted alkylene, alkylidene and cycloaliphatic radicals as well as alkarylene, cycloalkyl and aromatic radicals, and a ring fused to both Ar groups; and,
X" represents one or more inert substituents which if present, may each be the same or different and represent halogen, particularly chlorine or bromine; NO$_2$; alkyl having from 1 to about 18 carbon atoms, without regard for the spatial configuration such as normal, iso or tertiary; alkoxy having from 1 to about 18 carbon atoms; and, hydrogen.

As written in the structural formulae, it will be evident that the polynuclear phenol will have a RH on each phenyl ring, most preferably para- to each other, such substituents as may be present occupying one or more other positions on the ring.

Reaction between the DH(T)P$_1$ and DH(T)P$_2$ is effected with an electron withdrawing group as an activator to facilitate reaction between the two DH(T)Ps. For example, when one is BPA and the other is 4,4'-dichlorodiphenyl sulfone "DCPS", the SO$_2$ group is the activator, and the terminal Cl atoms react with the H of the BPA to provide an oligomer (segment A) with an alternating configuration. The identity of the activator group is not critical as long as it is inert in the reaction coupling the DHPs in the alternating configuration. Thus it will now be evident that when either of the DH(T)Ps is a diphenol linked with a weak activator group such as —O—, —S—, —S—S— or —Si—, then the other DH(T)P should be a diphenol linked with a strong activator group such as —CO— or —SO$_2$— to provide the alternating configuration. Most preferred are the strong activating groups such as the sulfone which bonds two halogen substituted benzenoid nuclei as in the 4,4'-dichlorodiphenyl sulfone and 4,4'-difluorodiphenyl sulfone, although such other strong withdrawing groups as hereinbefore mentioned may also be used with ease.

The alkyl substituents may be cyclic or acyclic, including alkyl-substituted cyclic, as long as the total carbon content conforms to the defined amount, and the same is true for alkoxy groups, provided all substituents are inert under reaction conditions. The inert substituents may be the same or different, though it will be apparent that some substituents will be easier than others for steric and other reasons.

Thus, it is seen that the particular structure of the dihydric phenol moiety is not narrowly critical. However, as would be expected, this moiety or residuum in the polymer chain can alter or vary the properties of the resultant polymer produced. Similarly, the reaction rate, optimum reaction temperature and like variables in the process can be varied by the selection of the particular dihydric phenol so as to give any desired change in rate, temperature, physical properties of the polymer and like changes.

As herein used the DH(T)P term defined as being the "residuum of the dihydric(thio)phenol" of course refers to the residue of the dihydric phenol or dihydric thiophenol after the removal of the two H atoms from the two aromatic hydroxyl groups. Thus as is readily seen these polyarylene polyethers contain recurring groups of the residua of DH(T)Ps, or of a DH(T)P and a compound containing a reactive HAM, bonded through aromatic ether oxygen or thioether atoms.

It is preferred that, of the two or more DH(T)P compounds used for alternating block copolymers, the first in segment A be a bisphenol type of compound, and the other segment A be a dihalobenzenoid compound which has the two halogens bonded to benzene rings having an electron withdrawing group in at least one of the positions ortho and para to the halogen group. The dihalobenzenoid compound can be either mononuclear where the halogens are attached to the same benzenoid ring, or polynuclear where they are attached in different benzenoid rings, as long as there is an activating electron withdrawing group in the ortho or para position of that benzenoid nucleus.

Any of the halogens may be the reactive halogen substituents on the benzenoid compounds. Fluorine and chlorine substituted benzenoid reactants are preferred; the fluorine compounds for fast reactivity and the chlorine compounds for their inexpensiveness.

More preferred are dihydric polynuclear phenols of the following four types including the derivatives thereof which are substituted with inert substituents:

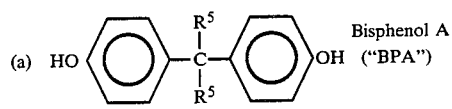

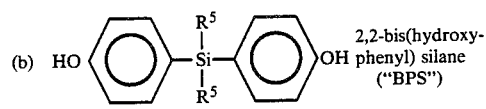

in which $R^5$ represents hydrogen, lower alkyl having from 1 to about 5 carbon atoms, phenyl and the halogen substituents thereof, and $R^5$ may each be the same or different.

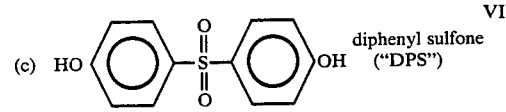

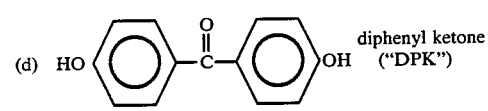

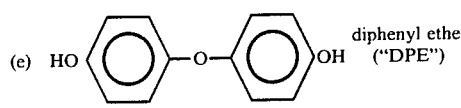

Most preferred are PAPE oligomers exemplified by alternating configurations of VI and VIII; VI and IX; VI and X; VIII and X; VII and IX; and IX and X, which oligomers are then difunctionalized by the process of this invention to yield difunctionalized poly[dihydric phenols] ("di-[DHP]" for brevity).

Examples of the particular foregoing polynuclear phenols, and others referred to by the structure (IV) are given in U.S. Pat. No. 4,108,837 the disclosure of which is incorporated by reference thereto as if fully set forth herein.

A preferred segment A is represented by the formula

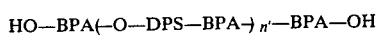

wherein BPA and DPS represent the residua of BPA and DHPS. The DHPS may be represented by the structure

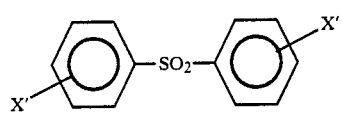

wherein the ring may have inert substituents and X' has the same connotation as that set forth hereinabove.

In the particular example of a specific APS (segment A), namely the oligomer of BPA and DCPS, it is formed by the reaction of an alkali metal salt of the BPA, or BTPA preferably the potassium or sodium salt, and DCPS in a PTC reaction, as described hereinbelow. The chain length of the APS oligomer formed is controlled by the relative ratio of BPA or BTPA and DCPS, a relatively lower $\overline{Mn}$ being obtained with a molar excess of BPA or BTPA; the larger the excess, the lower the $\overline{Mn}$. The oligomer has a backbone which includes a repeating unit [DPS-BPA], it being evident that when either moiety in the repeating unit is substituted with inert substituents, the repeating unit will be represented by [DPS(X")—BPA(X")]. Analogously, when the DHTP is BTPA, the repeating unit will be represented by [DPS(X")—BTPA(X")]

Though it is evident that the DH(T)P must always be a dihydric(thio)phenol, that is, have a single OH or SH group on each phenyl ring, it is not essential that the OH or SH group be at the 4-position, though this is the most convenient.

The physical and chemical properties of the di-[DH(T)P] oligomer formed may be tailored by the choice of the substituted (or not) DHP or DHTP used. Alkylation, alkoxylation or halogenation of BPA or BTPA yields a mixture of substituted products, alkylated products being most preferred among which the ortho-substituted BPA or BTPA predominates.

In the particular example of a specific segment B, namely an oligomer of BPA and cis- or trans-dichlorobutene "DCB", it is formed by the reaction of an alkali metal salt of the BPA, preferably the sodium salt, in a PTC reaction, as described hereinbelow. Again, the chain length is controlled by conventional means, and the resulting segment B is represented by the following formula XII

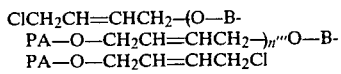
ClCH$_2$CH=CHCH$_2$—(O—B-
PA—O—CH$_2$CH=CHCH$_2$—)$_{n'''}$—O—B-
PA—O—CH$_2$CH=CHCH$_2$Cl in which the backbone includes a repeating unit [BPA—DCB], it being evident that when the BPA is substituted with inert substituents the repeating unit will be represented by [BPA(X'')—DCB].

In another specific example, segment B may be formed from an oligomer of DPK and DPS represented by the formula

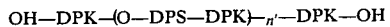
OH—DPK—(O—DPS—DPK)$_{n'}$—DPK—OH the sodium salt of which is reacted with DCB in a PTC reaction to yield a segment B having the formula

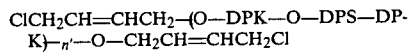
ClCH$_2$CH=CHCH$_2$—(O—DPK—O—DPS—DP-
K)$_{n'}$—O—CH$_2$CH=CHCH$_2$Cl which is an α-ω-di(chloroallyl)polyether ("PE").

A simple chain extended copolymer is represented by the formula

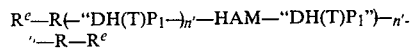
R$^e$—R(—"DH(T)P$_1$"—)$_{n'}$—HAM—"DH(T)P$_1$"')$_{n'}$-
'—R—R$^e$ in which the repeating unit corresponds to formula (III) hereinbefore where DH(T)P$_1$, DH(T)P$_2$ and DH(T)P$_3$ are the same. Of course chain extension may be obtained when DH(T)P$_1$ and DH(T)P$_2$ (segment A) are different, and segment B would be formed by providing segment A with haloallylic chain ends, before they were polycondensed.

In the simple example, chain extension is obtained with BPA and chloroallyl-terminated BPA formed by reacting BPA and cis- or trans-DCB. In another chain extension, an olgiomer of BPA-DPS having a $\overline{M}n$ of about 2550 is reacted with another oligomer of BPA-DPS having a $\overline{M}n$ of about 4175 which has chloroallyl chain ends.

THE PTC REACTION

A PAPE segment A oligomer is prepared by reaction of an excess of the sodium salt of BPA (to provide R$_2$$^e$RH phenolic or thiphenolic end groups) with DCPS in the presence of a solubilizing amount of a PTC under aqueous alkaline conditions. By a "solubilizing amount" of PTC I refer to an amount sufficient to solubilize the alkali metal salt (bisphenolate) of the [DH(T)P]$_{n'}$ formed in the aqueous phase. By "aqueous alkaline conditions" I refer to a large excess of an aqueous solution of an alkali metal hydroxide containing from about 15% to about 75% by weight (% by wt), and preferably from about 30% to about 50% by wt of alkali metal hydroxide. Preferred alkali metal hydroxides are those of sodium and potassium. By "large excess" I refer to an excess based on the number of moles of OH or SH groups originally present in the [DH(T)P]$_n$, preferably from about a two-fold (2 times) to a twenty-fold (20 times) excess.

A PAPE segment B oligomer is prepared in an analogous manner by condensation polymerization of an excess of a reactive HAM (say DCB) to provide haloallylic end groups, with BPA in an aromatic solvent and 3N aqueous NaOH reaction mixture in the presence of a large excess of PTC, at room temperature or slightly higher, and the segment B obtained by successive precipitaitons.

The alternating block or regular copolymers of PAPE segment A and PAPE segment B, are also prepared in an analogous manner by precipitating the salt of segment A in an aromatic solvent and aqueous alkali reaction mixture, redissolving the salt by addition of a large excess of PTC and adding a solution of the PAPE segment B in a halogenated aromatic solvent.

Because the rate of the PTC reaction is slow at low concentrations of PTC, the concentration of PTC used is a major molar amount, that is more than 50 mol %, so that the reaction proceeds at an economical rate.

The PTC reaction may be carried out in either (i) the precipitation mode, or (ii) the in situ mode, as described in greater detail in my copending application Ser. No. 586,679 filed Mar. 6, 1984, the disclosure of which is incorporated by reference thereto as if fully set forth herein.

The PTC reaction to prepare the alternating block copolymer, for example, may be carried out in the precipitation mode by (a) precipitating the salt of segment A from an organic solvent for the oligomer by reaction with an excess, based on the moles of —OH or —SH groups originally present in the oligomer, of an aqueous solution of an alkali metal hydroxide; (b) solubilizing the salt by adding a major molar amount of the PTC, based on the mole equivalents (mol equivs) of —OH or —SH groups originally present in the oligomer; and, (c) condensation polymerizing the solubilized salt with segment B present in at least an equimolar amount, based on the moles of —OH or —SH groups originally present in the segment A so that the alternating block PAPE copolymer formed has haloallylic chain ends which are reactive.

The foregoing PTC reaction may be carried out in the situ mode by forming the salt of segment A in situ by (a) contacting the segment A with the PTC dissolved in an organic solvent for the oligomer and PTC; thereafter (b) adding at least one molar equivalent of segment B for each mole of —OH or —SH groups originally present in the oligomer; then (c) adding an excess, based on the moles of —OH or —SH groups present, of an aqueous solution of an alkali metal hydroxide to obtain allylic chain ends.

By PTC, I refer to onium salts, macrocyclic polyethers (crown ethers), macrobicyclic polyethers (cryptands), and the like, most preferred being the onium salts of a Group VA element of the Periodic Table having certain structural limitations. The preferred salts have the formula R$_n$Y$^+$X$^-$ where Y is chosen from N, P and S; R represents either different or identical monovalent organic radicals bonded to Y by covalent linkages; X$^-$ is a counterion; and n is an integer which may be 3 or 4. When Y is pentavalent, for example P or N, then N=4, and when Y is tetravalent, for example S, then n=3. In an analogous manner, onium salts having certain multivalent organic substituents may be useful in this invention. Examples include multivalent organic radicals that include Y in a ring, and those that are bonded to more than one Y.

More preferred onium salts for use in this invention have the formula (R$_a$R$_b$R$_c$R$_d$Y$^+$)X$^-$ wherein Y is N or P, and R$_a$-R$_d$ are monovalent hydrocarbon radicals preferably selected from the group consisting of alkyl, alkenyl, aryl, alkaryl, aralkyl, and cycloalkyl moieties or radicals, optionally substituted with suitable heteroatom-containing functional groups. The total number of carbon atoms in $R_a$, $R_b$, $R_c$, and $R_d$ if the salt is quaternary, should be at least 10 and is preferably in the range from about 15 to 40. No theoretical maximum number of carbon atoms for inclusion in the onium salts exists, although in general, about 70 carbon atoms represents the upper limit imposed by practical limitations. Since the liquid phases involved are aqueous and organic, the number of carbon atoms and structure of the onium salts are usually selected to impart to the salt the requisite solubility in the organic phase. The onium salt itself is nonreactive to all materials in the reaction mixture except the reactants themselves, and the addition of the HAR to the PS takes place in the organic phase.

Most preferred onium salts have Y=N, and the hydrocarbon radicals where $R_a$ is $C_2H_5$, and $R_b$, $R_c$, and $R_d$ are each selected from the group consisting of n—$C_4H_9$; n—$C_5H_{11}$; mixed $C_5H_{11}$; n—$C_6H_{13}$; mixed $C_6H_{13}$; $C_6H_5$; $C_6H_5CH_2$; n—$C_8H_{17}$; n—$C_{12}H_{25}$; n—$C_{18}H_{37}$; mixed $C_8$-$C_{10}$ alkyl; and the like. However, $R_a$ may also be selected from n—$C_3H_7$ and n—$C_4H_9$.

Various counterions may be used, including $Cl^-$, $Br^-$, $I^-$, $F^-$, $HSO_4^-$ and the like. Most preferred is $HSO_4^-$. A commercially available and highly effective onium salt PTC is tetrabutylammonium hydrogen sulfate ("TBAH").

The reaction temperature and pressure conditions for forming segment A, segment B and the alternating block or regular copolymers of this invention are not critical, most reactions occurring at ambient (atmospheric) pressure and above ice-bath temperature (0° C.) but below a temperature at which the PAPE formed will prematurely polymerize, or above that which will deleteriously affect the structure of the oligomer. The pressure may range from about 1 to about 20 atms, and the precise temperature at which a particular reaction will proceed most favorably will depend upon the particular DH(T)P or reactive HAM chosen, the mol wt of the PAPE segments formed, and the solvent medium, inter alia, as one might expect, and may be determined with a little trial and error, as one skilled in the art would expect to do. Most preferred for forming the alternating block copolymers and regular copolymers is a temperature in the range from about 10° C. to about 150° C.

The main criterion for choice of the solvent is its insolubility in the aqueous alkaline phase, because the solubilization of the DH(T)P-salt or PAPE-salt with the PTC (say, TBAH) occurs quite readily in most organic phases, whether the salt is precipitated, or whether it is formed in situ and is solubilized without actually being precipitated. Solvents such as DMSO and THF which are soluble in water, but are essentially insoluble in this aqueous alkaline phase, may be used. To tailor an alternating block PAPE copolymer to conform with theoretical expectations, it is most preferred to use an inert, that is non-reactive, solvent such as dichlorobenzene or other inert halogenated aromatic, aliphatic or cycloaliphatic liquids.

Precipitation of the DH(T)P-salt or PAPE-salt will occur when the excess aqueous alkali is added to a solution of the salt in the organic solvent. The salt so formed is then solubilized by the PTC and is taken up by the organic phase. When the reactive HAM is added to form segment B, or to form a chain extended regular copolymer, reaction occurs and the PAPE oligomer is difunctionalized. This first mode of carrying out the difunctionalization is referred to as the "precipitation mode".

Precipitation of the salt is avoided when the PTC is dissolved in the organic phase and added to the DH(T)P and the reactive HAM then added. Added last, is the aqueous alkali so that the PAPE-salt is formed in situ and the desired difunctionalization results without actual precipitation of the PAPE-salt. This second mode of carrying out the difunctionalization is referred to as the "in situ mode". The reaction mixture is always homogeneous. The phenolate of the PAPE oligomer is not in contact with a solvent which might react with the terminal —OH or —SH group in the absence of the reactive HAM. As will be evident, such a reaction will preclude the effective difunctionalization sought. Formation of the alternating block PAPE copolymer or the regular copolymers formed by chain extension is in a manner analogous to that described hereinabove.

In a specific embodiment the invention is illustrated for a $[DHP]_n$ oligomer, APS segment A formed from BPA and DCPS, and, a sement B oligomer formed from BPA and DCB. The relatively low $\overline{Mn}$ APS oligomer was formed by the condensation of excess postassium salt of BPA and DCPS in anhydrous DMSO according to known methods, for example as described by R. N. Johnson et al in *J. Polym. Sci.*, A-1,5, 2375 (1967), inter alia. The yield is nearly 100% and the di-hydroxy oligomer obtained may be purified by precpitation from chloroform solution into methanol.

The $\overline{Mn}$ of the APS oligomer was determined by quantitatively esterifying the phenolic end groups and the degree of polymerization was determined by $^1$H-NMR spectra from the following relationships:

$$\overline{DD} + 1 = \frac{A_{CH_3}/6}{A_{DNBC(9.22)}/6} \text{ for } DNBC \text{ esterified (60-MHz)}$$

and $$\overline{DP} + 1 = \frac{A_{CH_3}/6}{A_{CBC(8.2)}/4} \text{ for } CBC \text{ esterified (200-MHz)}$$

wherein
DNBC=3,5-dinitrobenzoyl chloride, and,
CBC=4-cyanobenzoyl chloride.

Measured $\overline{Mn}$ were in the range from about 1000 to about 7000.

The degree of polymerization of the BPA-DCB segment B was determined by 200 MHz $^1$H-NMR spectrsocopy, based on the structure XII, and using the following relationships:

$$\overline{DP} = \frac{A_{-CH=CH-}/2}{A_{-CH_2Cl}/4} - 2 = \frac{A_{-CH_2O-}/4}{A_{-CH_2Cl}/4} - 1$$

Measured e,ovs/Mn/ were in the range from about 1000 to about 15,000. Various segment A and segment B oligomers listed in Table I were prepared and polycondensed to yield the chain extended (regular), and alternating block copolymers listed in Table II hereinbelow.

Relatively high mol wt alternating block copolymers and regular copolymers in the range from about $\overline{Mn}$ 10,000 to about 200,000 may be used with a conventional free radical initiator or simply thermally crosslinked while it is being injection molded into pump housings and the like. The crosslinked polymer is an engineering plastic which has excellent solvent resistance quite unlike commercially available PAPE, for example Udel ® APS which is available in the mol wt range of from about 20,000 to about 50,000, but with comparable physical strength. Lower $\overline{M}n$ alternating block and regular copolymers in the mol wt range from about 10,000 to about 100,000 may be crosslinked in solution with any monomer or macromer with a reactive vinyl group to form polymers which may also be used for various forming and molding applications. When crosslinking is not desired, the copolymers may have an even higher mol wt than 200,000 though the time required to form such copolymers militates against their economical preparation. Still another use for the alternating block and regular copolymers is for blending with polymers to improve their processability, and to increase the $T_g$ of the finished product because of the generally high $T_g$ contributed by the copolymers after crosslinking.

A particular segment B formed by the polycondensation of BPA with cis- and/or trans- DCB is given in the following Example 1.

EXAMPLE 1

A mixture of 5.02 g (0.022 mol) of BPA dissolved in 72 ml (0.24 mol) of 3N NaOH, 72 ml of toluene, 3.025 g (0.0242 mol) of cis- or trans-DCB, and 1.64 g (4.84 mmol) of TBAH was stirred at 70° C. for 5 hr. After cooling, the organic layer was diluted with toluene, washed with dil HCl solution and then with water, and dried over anhydrous MgSO₄. The polymer was precipitated twice into methanol; the second time from CHCl₃ solution. The yield was about 100% in both cases. The mol wt of segment B oligomers made in an analogous manner is controlled by conventional methods to yield oligomers preferably in the range from about 1200 to about 9,000.

Chain extension by copolymerization of an APS with a reactive HAM is illustrated in the following example 2.

EXAMPLE 2

2.42 g (0.95 mmol) of APS-1 (see Table I) were dissolved in 10 ml of chlorobenzene. 5 ml (0.015 mol) of 3N NaOH were added to the stirred solution and the sodium salt of the polysulfone precipitated immediately. After the addition of 0.645 g (1.9 mmol) of TBAH, the reaction mixture turned to a clear solution. 0.12 g (0.95 mmol) of cis-DCB were added and the reaction stirred at 70° C. for the reaction times given in Table II. After cooling, the polymer solution was washed with dilute HCl, water, and precipitated into methanol. The mol wt of the chloroallyl-chain ended APS is determined by that of the starting APS oligomer.

EXAMPLE 3

Formation of an alternating block copolymer of an APS or other DH(T)Ps with a segment B, particularly the BPA-DCB oligomer formed above having chloroallyl chain ends takes place in a manner analogous to that described hereinabove in example 2, except that segment B is first prepared and is used in a required amount sufficient to yield an alternating block copolymer of desired mol wt, instead of the reactive HAM used for chain extension.

Other alternating block copolymers may be prepared in an analogous manner using any preselected combination of one or more DH(T)Ps and reactive HAMs.

TABLE I

| Sample identif. | BPA:DCPS mole ratio | $\overline{M}n$ (theor.)** | $\overline{M}n$ (NMR) | Mi (GPC)* | $V_E$, ml (GPC)* | $T_g$ °C. |
|---|---|---|---|---|---|---|
| APS-1 | 1.50:1.0 | 24431 | 2550 | 2350 | 28.1 | 135 |
| APS-2 | 1.33:1.0 | 3353 | 3050 | 3900 | 27.5 | 138 |
| APS-3 | 1.25:1.0 | 4211 | 3410 | 5400 | 27.0 | 148 |
| APS-4 | 1.20:1.0 | 5096 | 3875 | 5700 | 26.9 | 146 |
| APS-5 | 2.0:1.0 | 1556 | 1210 | 1000 | 29.1 | 87 |

*each corresponds to the maximum of the GPC curve.
**calculated from theoretical DP and adding a BPA unit for the second chain end.

Chain extension of an APS with cis- or trans-DCB, and multiblock copolymerization of an APS with a PE having chloroallyl chain ends, yield chain extended copolymers and alternating block copolymers listed in Table II hereinbelow. The first four APS-1 alternating block copolymers are with segment B PEs containing only trans-DCB; the last two are with APS-4 and APS-5 which contain only cis-DCB in the PE.

TABLE II

| Sample identif | Segments (A)/(B) | mole ratio | Reaction time, hr. | $V_e$, ml (GPC)* | Mi (GPC)* | $T_g$ °C. |
|---|---|---|---|---|---|---|
| chain ext. | APS/t-DCB | 1.0:1.0 | 24.0 | 22.7 | 42000 | 153 |
| " | APS/c-DCB | 1.0:1.0 | 24.0 | 21.8 | 63000 | 160 |
| " | APS/c-DCB | 1.0:1.0 | 17.0 | 23.9 | 25000 | — |
| alt. block | APS-1/PE | 1.0:1.0 | 24.0 | 23.4 | 31000 | 88** |
| " | APS-1/PE | 1.0:1.2 | 24.0 | 21.8 | 63000 | — |
| " | APS-1/PE | 1.0:1.0 | 40.5 | 21.9 | 61000 | 79*** |
| " | APS-1/PE | 1.2:1.0 | 23.0 | 22.5 | 46000 | — |
| " | APS-4/PE | 1.0:1.0 | 37.5 | 23.2 | 34000 | — |
| " | APS-5/PE | 1.0:1.0 | 38.0 | 21.9 | 61000 | — |

*each corresponds to the maximum of the GPC curve.
***$T_g$ of APS/PE blend (mole ratio 1.0:1.0) = 70° C.
***$T_g$ of APS/PE blend (mole ratio 1.0:1.0) = 56° C.

The structure of the segments A and B, and those of the alternating block and regular copolymers formed by chain extension, were confirmed by gel permeation chromatography, by differential scanning calorimetry (DSC), by infra-red (IR) and nuclear magnetic resonance (NMR) analyses, details of which are set forth in the aforementioned articles co-authored by me.

For convenient reference, the following is a list of the acronyms used in the foregoing specification:
APS: α,ω-di(phenol)aromatic poly(thio)ether sulfone BPA: bisphenol A
BTPA: bisthiophenol A
B(T)PA: BPA and/or BTPA
BPAS: bisphenol A sulfone
BTPAS: bisthiophenol A sulfone
B(T)PAS: bisphenol A sulfone and/or bisthiophenol A sulfone
BPA(s): BPA with inert substituents
BTPA(s): bisthiophenol A with inert substituents
B(T)PA(s): BPA(s) or BTPA(s)
ClMS: chloromethylstyrene
DAPS: difunctionalized APS
DCPS: dichlorophenyl sulfone
DHP: dihydric phenol
DHPS: dihalophenyl sulfone
DHTP: dihydric thiophenol
DH(T)P: dihydric phenol and/or dihydric thiophenol
Di-[DHP]$_n$: difunctionalized poly[dihydric phenol]
DMF: dimethyl formamide
DMSO: dimethyl sulfoxide
DPE: diphenyl ether
DPK: diphenyl ketone
DPS: diphenyl sulfone
HQ: hydroquinone, 1,4-dihydroxybenzene
HAR: haloalkyl reactant or haloacyl reactant
K-t-Bu: potassium-tert-butoxide
PAPE: polyarylene polyether
Ph: phenol
PPO: polyphenylene oxide with inert substituents
PTC: phase transfer catalyst, phase transfer catalytic
TPh: thiophenol
$T_g$: glass transition temperature

I claim:

1. A substantially linear thermoplastic polyarylene polyether copolymer (PAPE) represented by the formula $$R^e-O-(\text{"PAPE"})-O-R^e$$

wherein, $R^e$ represents a residuum selected from $R_1^eX'$ and $R_2^eRH$;

$R_1^eX'$ represents a residuum of a reactive bis(haloallyl)moiety "HAM";

$R_2^e$ represents the group

$X'$ represents halogen selected from the group consisting of fluorine, chlorine and bromine;

$X''$ represents an inert substituent defined hereinbelow; and,

"PAPE" represents the residuum of an oligomer selected from an unsaturated alternating block copolymer represented by

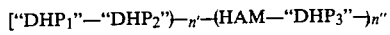

and a regular unsaturated oligomer formed by chain extension represented by

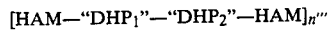

wherein, "DHP$_1$" and "DHP$_2$" are the residues of dihydric phenols DHP$_1$ and DHP$_2$ which are the same or different, and "DHP$_3$" is the residue of a dihydric phenol DHP$_3$ which may be the same as either DHP$_1$ or DHP$_2$, or different;

HAM represents the residue of a reactive bis(haloallyl)moiety selected from a bis(haloallyl)olefin having from 4 to about 20 carbon atoms including cis- or trans-dichlorobutene, a bis(haloallyl)cycloolefin having from 4 to about 8 ring carbon atoms including 1,4-bis(chloromethy)-1,3-cyclohexadiene, and a bis(haloallyl)arylene having from 8 to about 26 carbon atoms including 1,4-bis(chloromethyl)benzene; and, n', n'' and n''' independently represent an integer in the range from 2 to about 100.

2. A substantially linear thermoplastic polyarylene polyether alternating block copolymer represented by the formula

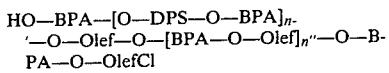

wherein,

BPA represents the residue of

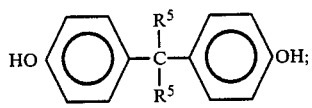

DPS represents the residue of

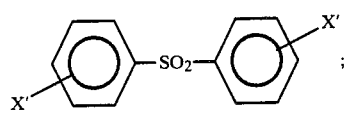

$X'$ represents halogen selected from the group consisting of fluorine, chlorine and bromine;

$R^5$ represents hydrogen, lower alkyl having from 1 to about 5 carbon atoms, phenyl and the halogen substituents thereof, and $R^5$ may each be the same or different;

Olef represents the olefin residue of an $\alpha$-$\omega$ dihaloolefin having from 4 to about 20 carbon atoms; and, n' and n'' independently represent an integer in the range from 2 to about 100.

3. A process for forming a substantially linear thermoplastic polyarylene polyether alternating block copolymer represented by the formula

[Seg A][Seg B]

and more fully,

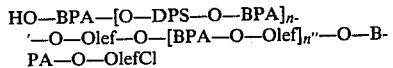

wherein,

Seg A represents the residue of segment A consisting essentially of

Seg B represents the residue of segment B consisting essentially of

ClOlef—O—[BPA—O—Olef]$_{n''}$—O—BPA—O—OlefCl

BPA represents the residue of

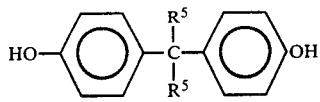

DPS represents the residue of

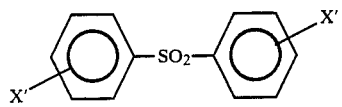

X' represents halogen selected from the group consisting of fluorine, chlorine and bromine;
R$^5$ represents hydrogen, lower alkyl having from 1 to about 5 carbon atoms, phenyl and the halogen substituents tehreof, and R$^5$ may each be the same or different;
Olef represents the olefin residue of an α-ω dihaloolefin having from 4 to about 20 carbon atoms; and,
n' and n'' independently represent an integer in the range from 2 to about 100,
said process comprising,
(a) reacting a salt of segment A with a salt of segment B;
(b) precipitating said block copolymer from solution; and,
(c) recovering said block copolymer.

4. The process of claim 3 wherein said olefin residue is selected from the group consisting of a dihaloolefin which provides acyclic allylic chain ends, a dihalocycloolefin which provides cyclic allylic chain ends, and a dihaloarylene which provides aryl(benzylic) chain ends, so that the residue functions as a chain extending segment B to yield said regular (chain-extended) polyarylene polyether copolymer.

5. The process of claim 3 wherein segment B represents the residue of at least one polynuclear dihydric phenol having reactive haloallyl chain ends, selected from the group consisting of acyclic chain ends derived from a dihaloolefin, cyclic allylic chain ends derived from a dihalocycloolefin, and aryl allylic(benzylic) chain ends derived from a dihaloarylene, so that said residue functions as said segment B to yield said alternating block polyarylene polyether copolymer.

6. The process of claim 3 including the steps of
(a) precipitating said salt from an organic solvent for said polyarylene polyether oligomer by reaction with an excess, based on the moles of —OH groups originally present in said polyarylene polyether oligomer, of an aqueous solution of an alkali metal hydroxide;
(b) solubilizing said salt by adding a major molar amount of said phase transfer catalyst, based on the mole equivalents (mol equivs) of —OH groups originally present in said polyarylene polyether oligomer; and,
(c) reacting solubilized salt with said dihaloolefin present in about an equimolar amount, based on the moles of —OH groups originally present in said polyarylene polyether oligomer.

7. The process of claim 6, wherein step (c) is carried out at a temperature in the range from about 10° C. to about 150° C. and at a pressure in the range from about 1 to about 20 atmospheres.

8. The process of claim 3, including the steps of
(a) forming said salt in situ by contacting said polyarylene polyether oligomer with said phase transfer catalyst dissolved in an organic solvent for said polyarylene polyether oligomer and phase transfer catalsyt; thereafter
(b) adding about one molar equivalent of said dihaloolefin for each mole of —OH groups originally present in said polyarylene polyether oligomer; then
(c) adding an excess, based on the moles of —OH groups present, of an aqueous solution of an alkali metal hydroxide.

9. The process of claim 4 wherein step (c) is carried out at a temperature in the range from about 10° C. to about 150° C. and at a pressure in the range from about 1 to about 20 atmospheres.

* * * * *